(12) United States Patent
Glebov et al.

(10) Patent No.: US 6,917,748 B2
(45) Date of Patent: Jul. 12, 2005

(54) VARIABLE OPTICAL ATTENUATOR ON AN ELECTRO-OPTICAL LAYER

(75) Inventors: Alexei Glebov, San Mateo, CA (US); Shigenori Aoki, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 147 days.

(21) Appl. No.: 10/611,704

(22) Filed: Jul. 1, 2003

(65) Prior Publication Data

US 2005/0002634 A1 Jan. 6, 2005

(51) Int. Cl.⁷ .............................................. G02B 6/00
(52) U.S. Cl. .............................. 385/140; 385/2; 385/14; 385/131
(58) Field of Search .................... 385/2, 8, 14, 30, 385/130, 131, 140–145

(56) References Cited

U.S. PATENT DOCUMENTS

| | | | |
|---|---|---|---|
| 6,441,955 B1 | 8/2002 | Takatsu et al. | 359/341.4 |
| 6,546,163 B2 | 4/2003 | Thackara | 385/18 |
| 6,553,175 B2 * | 4/2003 | Jaspan | 385/140 |

* cited by examiner

*Primary Examiner*—Phan T. H. Palmer
(74) *Attorney, Agent, or Firm*—Sheppard, Mullin, Richter & Hampton LLP

(57) ABSTRACT

The intensity of signals in optical networks can be controlled using a variable optical attenuator (VOA). The present invention is a VOA that is particularly well suited for optical networks, for example to provide channel-by-channel normalization of gain control of wavelength division multiplexed signals. The inventive VOA includes a waveguide having an electro-optical material and electrodes that produce an electric field within the electro-optical material when a voltage difference is applied to the electrodes. The electro-optical material can either be a substrate or can be a layer deposited on a substrate. In an alternative embodiment, a polarization independent VOA is formed from a waveguide that includes two, end-to-end waveguides. In one embodiment, a 90 degree polarization rotator is provided between the two waveguides. In another embodiment, each of the two waveguides has a different electro-optical material selected to selectively pass one of two 90 degree polarizations.

21 Claims, 11 Drawing Sheets

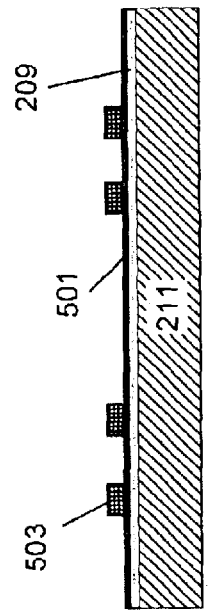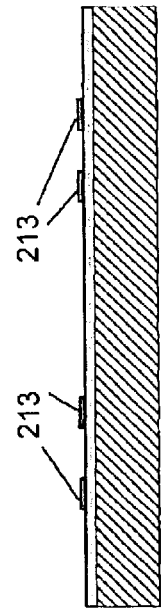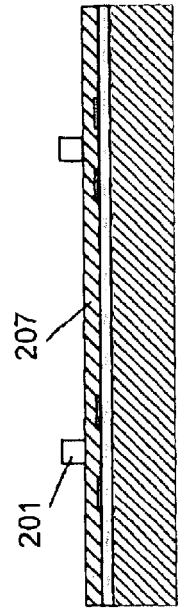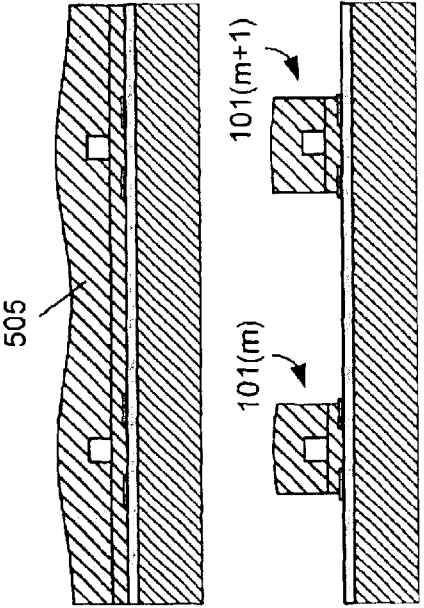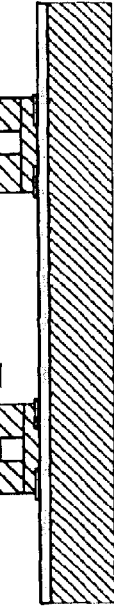
FIG. 5A
FIG. 5B
FIG. 5C
FIG. 5D
FIG. 5E

VARIABLE OPTICAL ATTENUATOR ON AN ELECTRO-OPTICAL LAYER

FIELD OF THE INVENTION

The present invention relates generally to optical communications device technology, and more particularly, to variable optical attenuators formed on electro-optical materials.

BACKGROUND OF THE INVENTION

High-speed optical networks transmit information long distances as light signals through optical fibers. Amplification of optical signals is required at regular intervals along the network to maintain signal strength, preferably using optical amplifiers. Since some advanced networking techniques transmit many channels simultaneously through the same fiber, it is important that the gain is the same for each channel. For example, networks that use wavelength division multiplexing (WDM) transmit many channels over the same fiber, with each channel at a different wavelength. Since current optical amplifiers have wavelength dependent gains, repeated amplification can distort the information being transmitted. Wavelength-dependent gain can be overcome by optical equalization of the different signal channels. In practice, this equalization is performed by use of a variable optical attenuator (VOA).

There are several types of VOAs currently available. In one type of VOA, a Mach-Zehnder interferometer has a material in the optical path having a temperature dependent refractive index (the "thermo-optic effect"). The interferometer is configured such that a change in the temperature of the thermo-optic material results in a change in the output light intensity. Attenuation is thus adjusted by control of the temperature of the thermo-optic material. Although thermo-optic VOAs have good optical coupling properties and are polarization independent, they suffer from high power usage and a slow response time of greater than 10 ms, and thus they are not appropriate for high speed networking.

Another currently available VOA employs microelectromechanical system (MEMS) elements, in which movable, micro-elements are used to attenuate light. MEMS devices are also rather slow, with response times on the order of milliseconds, and have reliability issues resulting from the many moving parts of the VOA.

In addition to speed and reliability, there is also a need to have VOAs that can be assembled into arrays or into other devices. For the large number of channels envisioned for WDM networks, it would be a great advantage to be able to fabricate VOAs of smaller size, to assemble VOAs into arrays, and to incorporate them into other WDM devices, such as multiplexers or demultiplexers. Heretofore, it has been difficult to configure prior art VOAs into arrays or within other devices.

Therefore, it would be desirable to have a VOA that is faster than currently available devices, and that can be assembled in large numbers as an array. It is also desirable to have a VOA that is manufactured by techniques that allow for integration into other WDM devices.

SUMMARY OF THE INVENTION

The present invention solves the above-identified problems with VOAs by providing waveguides having attenuation that is controlled by application of an electric field to an electro-optical material that is part of the waveguide or is adjacent to a cladding of the waveguide.

It is one aspect of the present invention to provide a variable optical attenuator that uses the electro-optic effect to controllably change the transmission of light through a waveguide. In one embodiment of the invention, the waveguide is adjacent to an electro-optical material having a refractive index that can be varied between a first refractive index and a second refractive index by application of a voltage difference to electrodes adjacent to the electro-optical material. When the electro-optical material has a refractive index equal to the first refractive index, the waveguide is a low-loss waveguide. When the electro-optical material has a refractive index equal to the second refractive index, light is coupled from the waveguide into the electro-optic material. By including a plurality of such waveguides between a demultiplexer and a multiplexer, a WDM signal can be separated into individual channels, the individual channel intensities can be varied, and an attenuated WDM signal can be reconstituted.

In another aspect of the present invention, polarization independent variable optical attenuators are provided using electro-optical materials. In one embodiment, a waveguide is provided having a first waveguide and second waveguide separated by a polarization rotating element that rotates the light passing between the two waveguides by 90 degrees. The electro-optical material attenuates light by preferentially allowing leakage from the waveguide according to the polarization of light therein. Rotating the polarization between two waveguides provides polarization independent attenuation. In an alternative embodiment, a waveguide is provided as a first waveguide that includes a first electro-optical material and a second waveguide that includes a second electro-optical material. The first and second electro-optical materials differ in that in the first material the ordinary refractive index is greater than the extraordinary refractive index, and in the second material the ordinary refractive index is less than the extraordinary refractive index.

In another aspect of the present invention, an attenuator is provided having a waveguide with a core of a first refractive index, a cladding of a second refractive index, and an electro-optical material of a third refractive index. The value of the third refractive index varies according to the electric field from the first refractive index to the second refractive index.

In one aspect of the present invention, a device is provided for variably attenuating an optical signal. The device includes a waveguide having a cladding and an electro-optical material adjacent to at least a portion of the cladding. At least two electrodes are also included to produce an electric field within the electro-optical material, and the attenuation of light through the waveguide varies with an applied voltage difference to the electrodes. In one embodiment of the present invention, the electro-optical material is a substrate on which the device is formed. In an alternative embodiment, the electro-optical material is a layer formed on a silicon substrate.

In another aspect of the present invention, a device is provided for variably attenuating a plurality of optical signals. The device includes a plurality of waveguides to each attenuate one of the plurality of optical signals. Each of the plurality of waveguides has a cladding and an electro-optical material layer adjacent to at least a portion of the cladding. The device also includes at least two electrodes associated with each of the plurality of waveguides. The electrodes produce an electric field within an associated electro-optical material layer. The attenuation of individual ones of the plurality of optical signals varies with an applied voltage difference to the associated electrodes. In one embodiment of the present invention, the device further includes a silicon substrate to support the electro-optical material. In an alternative embodiment, the substrate is an electro-optical material.

In another aspect of the present invention, a device for variably attenuating a plurality of optical signals each between an input and an output. The device includes a plurality of waveguides, one for each optical signal. Each waveguide includes a core between an input and an output having a first refractive index, a cladding surrounding a substantial length of the core and having a second refractive index different from the first refractive index, an electro-optical material surrounding at least a portion of the cladding, and at least two electrodes to produce an electric field within the electro-optical material. The attenuation of each of the plurality of optical signals is individually varied by an applied voltage difference to corresponding ones of the at least two electrodes. In one embodiment of the present invention, the electro-optical material has a third refractive index variable by the electric field between the value of the first refractive index to the value of the second refractive index.

In a further aspect of the present invention, an array of variable optical attenuators is provided that is more reliable and less expensive than those of the prior art.

BRIEF DESCRIPTION OF THE DRAWINGS

The foregoing aspects and the attendant advantages of this invention will become more readily apparent by reference to the following detailed description when taken in conjunction with the accompanying drawings wherein:

FIGS. 5A–5E are schematic diagrams showing the formation of the first embodiment VOA at several sequential steps in a first embodiment manufacturing process;

Reference symbols are used in the Figures to indicate certain components, aspects or features shown therein, with reference symbols common to more than one Figure indicating like components, aspects or features shown therein.

DETAILED DESCRIPTION OF THE INVENTION

The present invention is directed to a VOA that overcomes the problems associated with currently available VOAs. For example, VOAs provided in accordance with the present invention are faster than current VOAs, and can be manufactured in closely packed arrays. They are thus readily usable in WDM networks. Also, the inventive VOAs are manufactured using conventional fabrication processes, thereby allowing them to be integrated into other networking devices.

Figure 1:
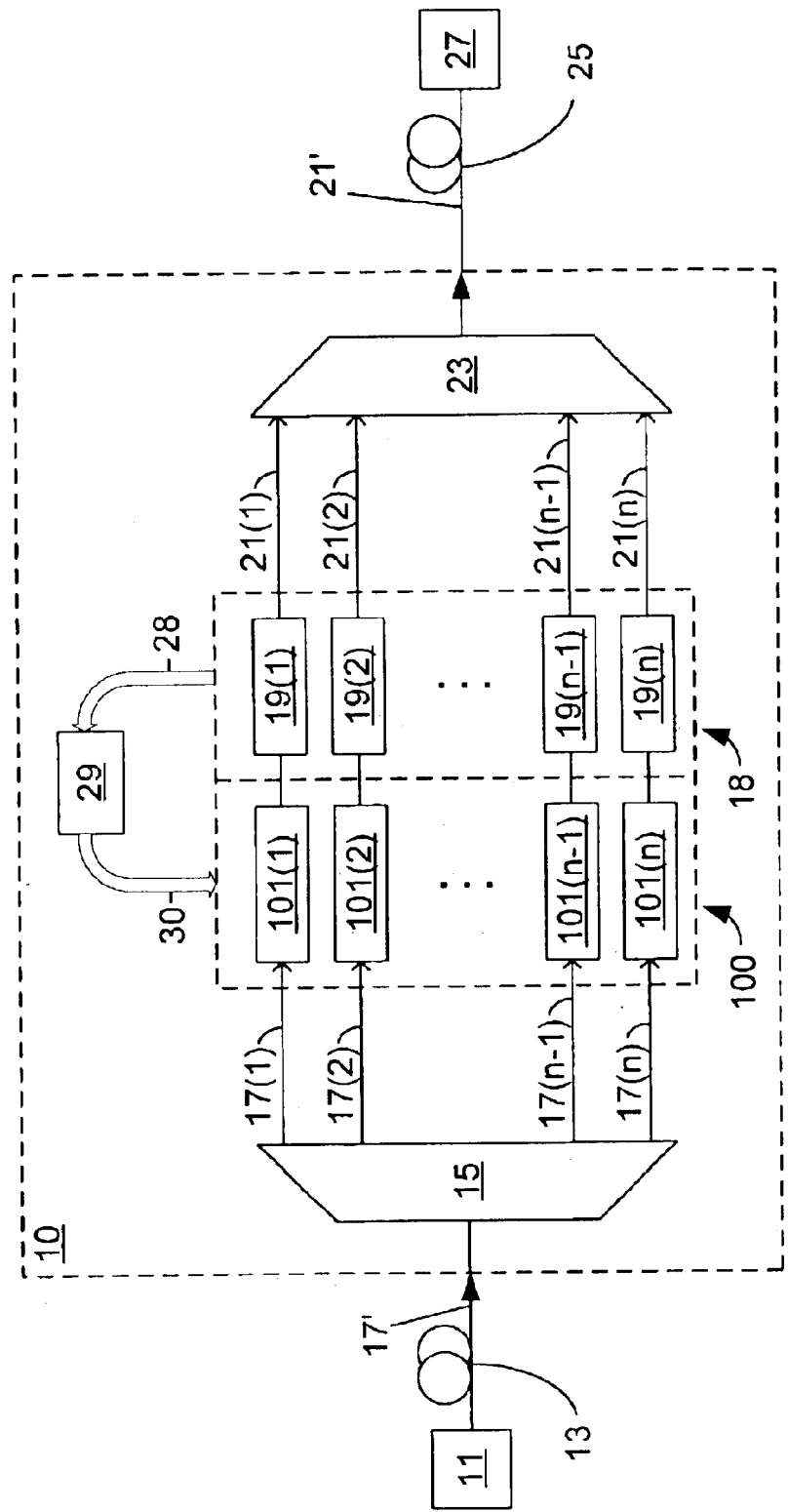
FIG. 1 is a schematic of an array of VOAs of the present invention for gain control in a WDM network.

FIG. 1 shows a schematic of a VOA array 100 of the present invention as used in a gain equalizer 10 of a WDM network. A source 11 of a WDM signal 17' is shown being transmitted through a fiber 13 to gain equalizer 10. As described below, gain equalizer 10 separately adjusts the intensity of each WDM signal 17' to produce an equalized signal 21' that is then transmitted through a fiber 25 to a WDM signal receiver 27.

Signals 17' and 21' each contain 2 or more individual signals or channels. The number of channels is indicated herein as "n," where n is a number equal to or greater than 2. Individual ones of signal 17' are denoted, in general, as signal 17, as one of signals 17(1), 17(2), . . . , 17(n), or in reference to one of signal 17(m), where m is a generalized index. Individual ones of signal 21' are denoted by a similar reference to signal 21, one of signals 21(1), 21(2), . . . , 21(n), or by reference to index m, as in signal 21(m).

As shown in FIG. 1, gain equalizer 10 further includes a demultiplexer (DMUX) 15, an array intensity monitors 18, and a multiplexer (MUX) 23. VOA array 100 and intensity monitor array 18 each include n separate components to attenuate and monitor each of the n channels. Thus VOA array 100 includes n separate VOAs, specifically VOA 101(1), VOA 101(2), . . . , VOA 101(n). Individual ones of the array of VOAs are referred to herein as VOA 101, or by a number other than n, for example the $m^{th}$ VOA is referred to as VOA 101(m). Intensity monitor array 18 includes n separate intensity monitors, specifically intensity monitors 19(1), 19(2), . . . , 19(n), or in general, intensity monitor 19. Each of the n channels of the WDM signal is processed by one VOA and is monitored with one intensity monitor.

Also included in gain equalizer 10 is a controller 29 to adjust the attenuation of each VOA 101. Specifically, each intensity monitor 19 monitors the light signal passing through the monitor and provides a signal 28 to controller 29 that is proportional to the intensity of the signal 17. In one embodiment, controller 29 then generates an electrical signal 30 according to signal 28 and the programming of the controller that acts to modify the attenuation of individual ones of VOA 101. In another embodiment, gain is controlled by constantly monitoring a small portion of signal 28.

DMUX 15 accepts a WDM signal 17' and separates the WDM signal into n separate signals, 17(1), 17(2), . . . , 17(n). Each of the n signals proceeds through a corresponding one of the individual VOA 101, through one of the n intensity monitors 19, and into MUX 23 that recombines the n signals into equalized WDM signal 21'.

Figure 2A:
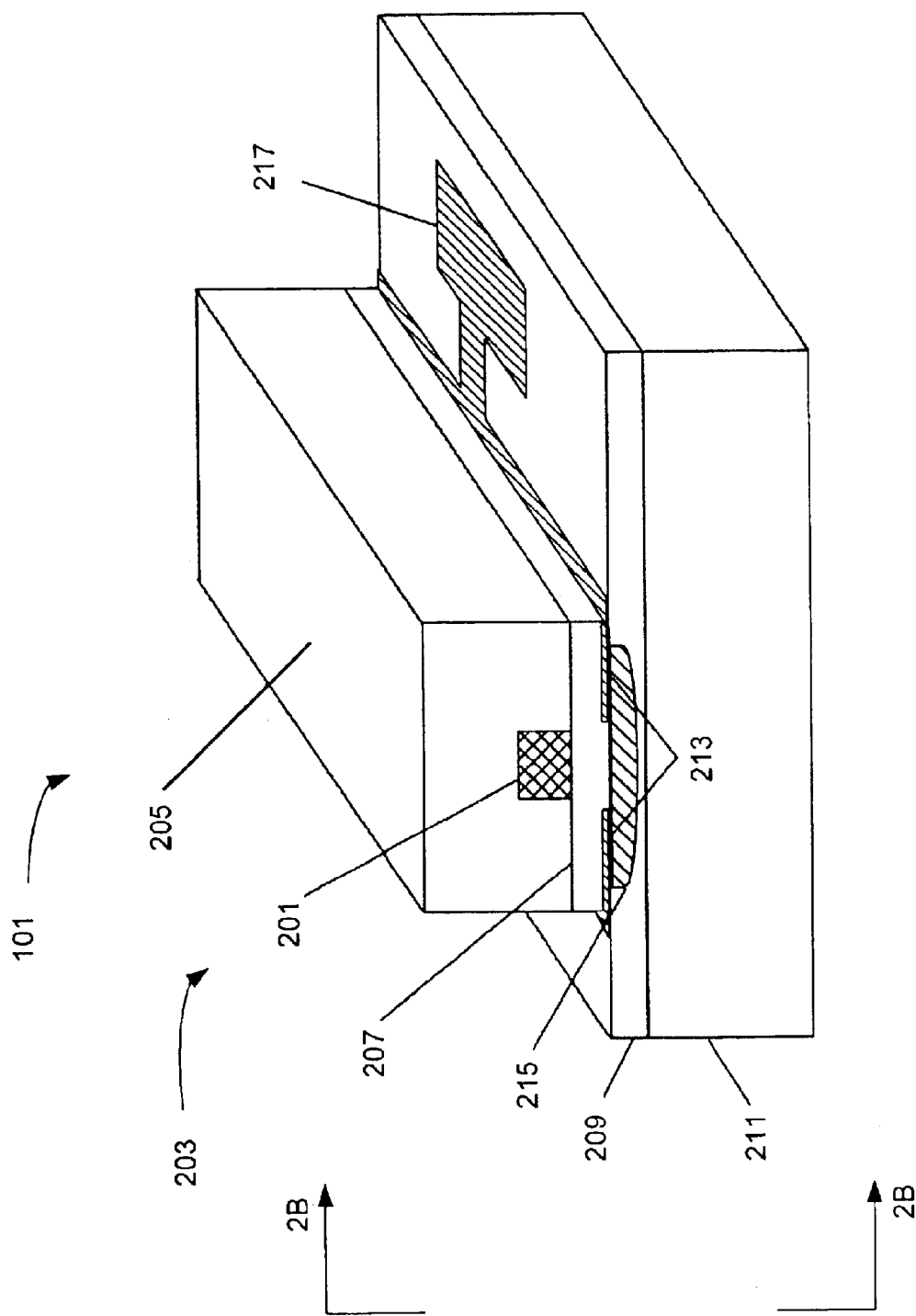
FIG. 2A is a perspective view of a section of a first embodiment VOA of the present invention as a VOA formed on an electro-optic film.
Figure 2B:
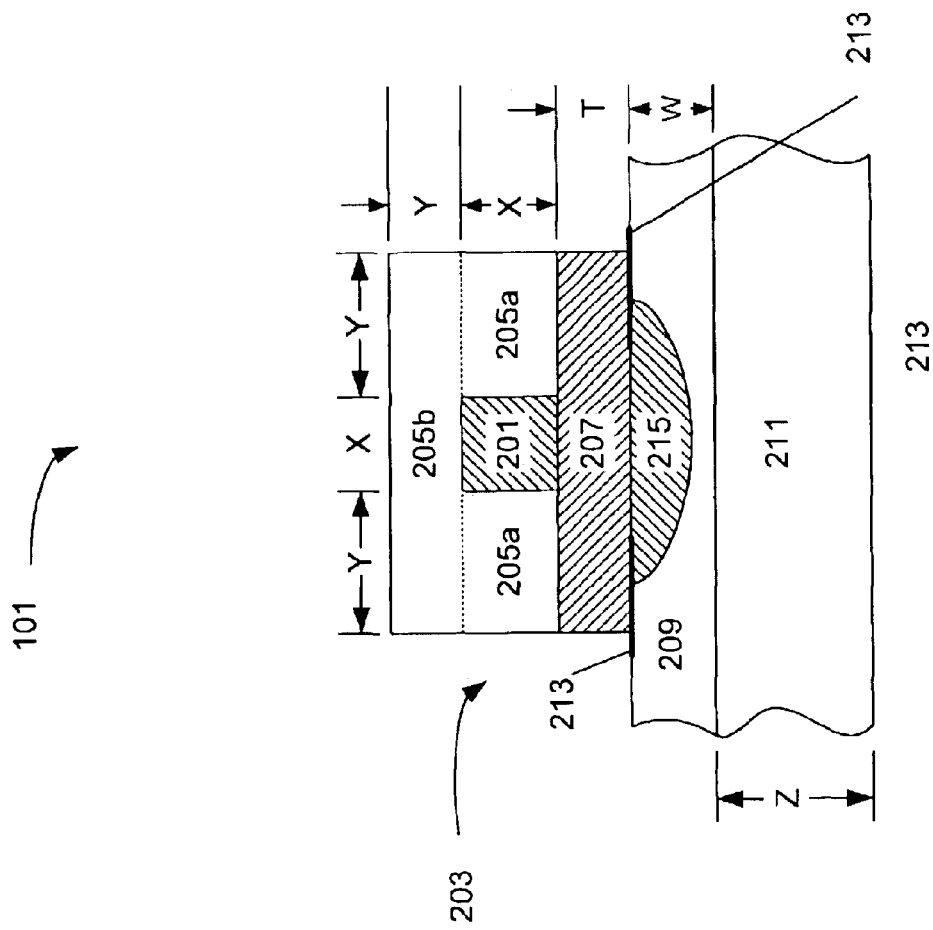
FIG. 2B is a section view 2B—2B of FIG. 2A.
Figure 3:
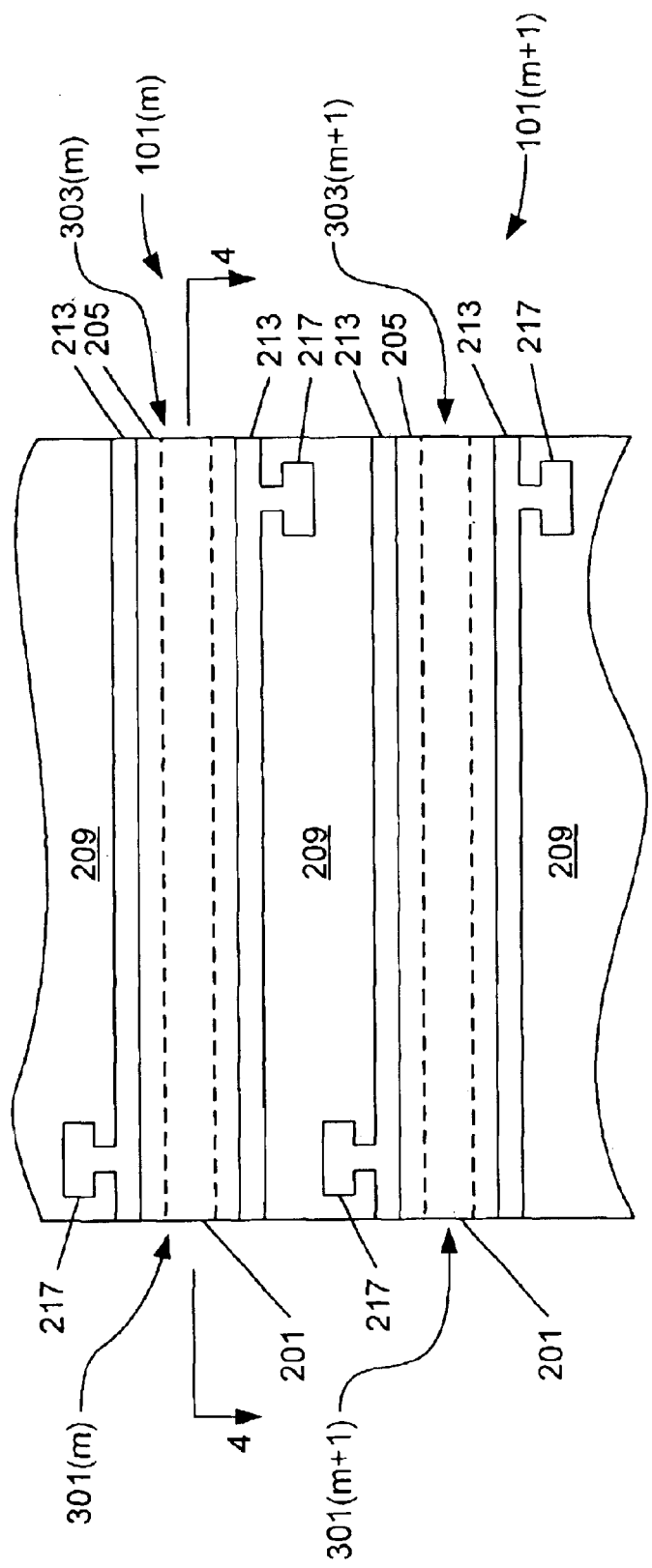
FIG. 3 is a top view of an array of two VOAs of FIG. 2.
Figure 4:
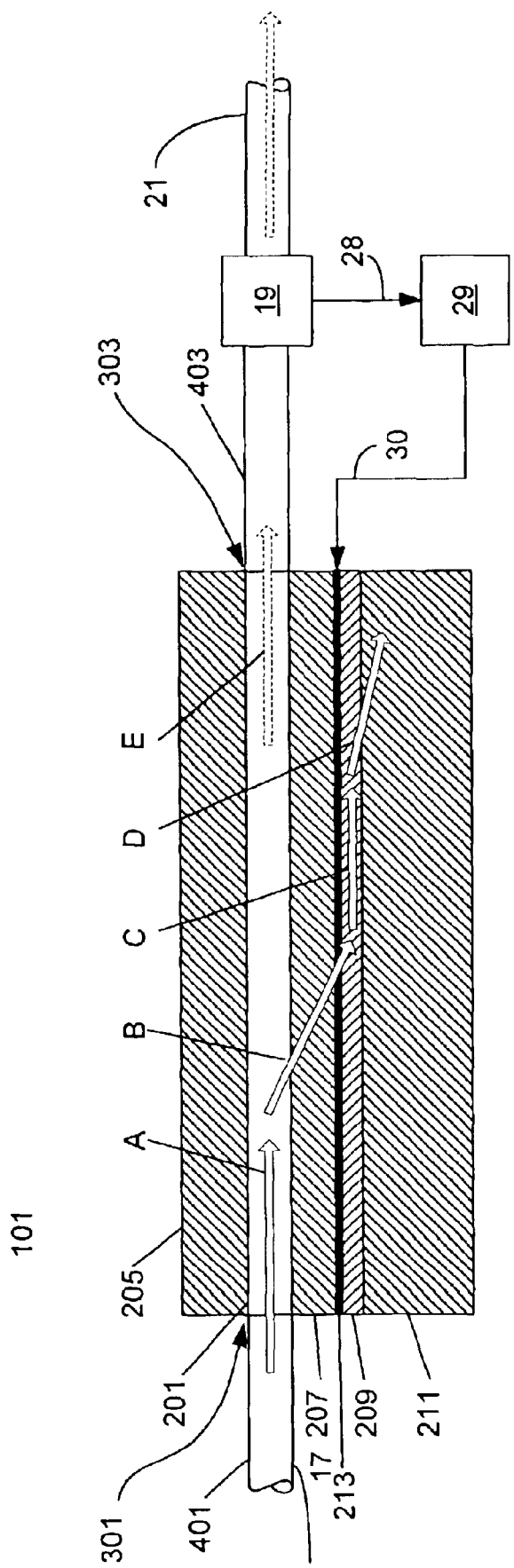
FIG. 4 is a sectional side view 4—4 of FIG. 3 also illustrating the propagation of light through the VOA.

A first embodiment VOA of the present invention is shown in more detail in FIGS. 2–4, where FIG. 2A is a perspective view of a section of VOA 101 formed on a layer 209 of an electro-optical material, FIG. 2B is a section view 2B—2B of FIG. 2A, FIG. 3 is a top view of an array of two VOAs of FIG. 2, indicated as VOA 101(m) and 101(m+1), and FIG. 4 is a sectional side view 4—4 of FIG. 3 also illustrating the propagation of light through the VOA. As shown in FIGS. 3 and 4, each VOA 101 extends from an input 301 to an output 303. The sectional views of FIGS. 2A and 2B further show the VOA 101 structure between input 301 and output 303 to include a waveguide core 201 surrounded by a cladding 203, a pair of electrodes 213, layer 209 of an electro-optical material, and a substrate 211 that supports layer 209. Input 301 and output 303 correspond to the ends of core 201, where light is coupled into the core at the input by a fiber 401 and where is coupled out of the core at the output into a fiber 403.

The materials of core 201 and cladding 203 are optically transparent materials for wavelengths of the WDM signal. The materials of layer 209 and substrate 211 can be, but are not required to be, optically transparent at the WDM wavelengths. The material optical properties and dimensions, as well as the spacing and placement of electrodes 213, are selected to controllably pass, attenuate, or block light traveling across VOA 101 from input 301 and towards output 303 according to the electro-optically controllable refractive index of layer 209, as follows. When layer 209 has a refractive index equal to the refractive index of core 201, the dimensions and materials of VOA 101 are such that the core and cladding 203 are a high-loss waveguide between input 301 and output 303. When layer 209 has a refractive index equal to that of lower cladding 207, the dimensions and materials of VOA 101 are such that core 201 and cladding 203 are a low-loss waveguide of light entering core 201. At refractive index values between that of core 201 and lower cladding 207, a controllable fraction of the light is transmitted across the variable optical attenuator 101.

Core 201 is preferred to have a cross-sectional shape that is rectangular or square. As shown in the preferred embodiment of FIG. 2B, core 201 has a square cross-section with each side having a length X. The top and side cladding layers 205b and 205a each have a thickness Y. The lower cladding 207 has a thickness T. Layer 209 has a thickness W, and substrate 211 has a thickness Z. In an alternative embodiment, not shown, core 201 has a cross-section that is not square and is, for example, rectangular.

Core 201 and cladding 203 cooperate according to their dimensions and optical properties, specifically having different refractive indices, to act as a waveguide for light between input 301 and output 303. In a preferred embodiment, cladding 203 includes an upper cladding 205 and a lower cladding 207 as shown in FIGS. 2 and 4. Upper cladding 205 can further be differentiated by the portions shown in FIG. 2B as side claddings 205a and an upper cladding 205b. Preferably the upper cladding 205 and lower cladding 207 have the same refractive index.

It is preferred that attenuation of light through core 201 is modified by changing the refractive index of material adjacent lower cladding 207 according to the voltage difference applied to the pair of electrodes 213, and that little or no voltage difference is required for VOA 101 to be a low-loss waveguide. When no voltage difference is applied, the refractive index of layer 209 is the same as that of lower cladding 207, and VOA 101 is a low-loss waveguide. The pair of electrodes 213 is positioned relative to layer 209 such that, when a voltage difference is applied to the electrodes, an electric field is established that affects the refractive index of layer 209 in a region 215 adjacent to cladding 203. For a thin layer 209, for example when the thickness is 10 $\mu$m or less, a sufficiently large voltage applied to electrodes 213 modifies the refractive index of the whole film thickness W. In general, electrodes 213 and layer 209 are positioned relative to cladding 203, core 201, and substrate 211 such that electrodes supplied with a potential difference result in a uniform change in refractive index of the layer from input 301 to output 303. It is preferred that electrodes 213 extend along VOA 101 from input 301 to output 303 and that they are transversely spaced on either side of core 201. The fraction of light entering input 301 that emerges from output 303 can be controlled according to the voltage difference applied to each pair of electrodes 213. The control of the light signal through VOA 101 is thus achieved by modifying the refractive index of electro-optic layer 209 by the application of an electric field to the layer according to the voltage difference across electrodes 213.

The electro-optic effect is intrinsically very fast, resulting from atomic level changes to the electro-optical material. These changes can occur with speeds faster than several nanoseconds. The operational speed of VOA 101 can be as fast as from about 1 to about 500 nanoseconds. One limiting speed factor is delays in the electronics driving the VOA due to wiring and propagation of the electrical signal from electrodes.

The refractive index of layer 209 is variable according to the electro-optic effect to change between the refractive index of the core and the refractive index of the cladding. Preferred materials for core 201 include optical polymers, including but not limited to low loss optical polyimides and epoxies. Preferred materials for cladding 203 are the same as for core 201 with dopants added to modify the cladding refractive index to be slightly smaller than that of the core, for example 0.2% to 1%. Preferred materials for substrate 211 include, but are not limited to materials typically used in manufacturing of substrate wafers, such as silicon. Preferred materials for layer 209 include materials that have refractive index ranges between those of the core and cladding and have electro-optic coefficients that allow their use with reasonable applied voltages.

In one embodiment, core 201 and cladding 203 are formed from one type of optical polymer, and layer 209 is formed from the same or a similar polymer with additives, including but not limited to electro-optic polyimides, that make the polymer electro-optic.

In another embodiment, core 201 and cladding 203 are fabricated from thin films of higher refractive index materials then layer 209, which is formed material which include, but are not limited to: $LiNbO_3$, $LiTaO_3$, KDP, KTP, and $LiIO_3$. The operation of VOA 101 with these materials requires an electric field on the order of about 1 to about 100 V/$\mu$m for appropriate modification of the refractive index. Preferred electrode spacing to produce his electric field are from about 5 to about 20 $\mu$m, with a preferred voltage difference of about 10 to about 100 volts.

The application of a voltage difference to the pair of electrodes 213 modifies the refractive index of layer 209 near lower cladding 207 to the value away from that of the cladding and towards the refractive index of core 201. Under these conditions a fraction of the light propagating through core 201 is coupled out of the waveguide according to the value of the refractive index and the thickness T of cladding between the core and layer 209. FIG. 4 is a sectional side view 4—4 of FIG. 3 illustrating the propagation of light through the VOA 101. Light from input 301 is shown schematically at arrow A entering core 201 from fiber 401. When the refractive index of layer 209 is the same as that of cladding 203, and specifically of lower cladding 207, the majority of light propagating in core 201 travels from the input 301 to the output 303, and into fiber 403, as indicated schematically as the output of light by arrow E. When the refractive index of layer 209 is the same as that of core 201, light "leaks" from core 201 through lower cladding 207, as indicated schematically by arrows B, C, and D. As indicated by arrows B and C, under these conditions light first propagates through lower cladding 207 and into that portion of layer 209 having the electro-optically elevated refractive index. When the refractive index of substrate 211 is higher than that of layer 209, cladding 203, or core 201, and as shown by arrow D light thus propagates into the substrate and away from the core. When the light arrives at output 303, there is reduced light intensity at the output to be coupled out of core 201 and into fiber 403 because a proportion of the light has been redirected out of the core. In an alternative embodiment, layer 209 has a high absorption coefficient at the light wavelength, resulting in a higher loss.

As is also shown in FIG. 4, fiber 403 provides light to intensity monitor 19, which provides electrical signal 28 to controller 29. Controller 29 also provides voltage or voltages to electrodes 213, thereby controlling the amount of attenuation of VOA 101. Controller 29 can supply different voltages to different ones of VOAs 101 to control the gain of individual WDM signal channels.

One embodiment for light having a wavelength in the vicinity of 1550 $\mu$m has a refractive index of core 201, R.I.(core), of 1.567, and a refractive index of cladding 203, R.I.(cladding), of 1.563. Preferably, dimension X is 7 $\mu$m, thickness Y is from 5 $\mu$m to 30 $\mu$m preferably 10 $\mu$m, thickness T is from zero to 10 $\mu$m, preferably from 3 $\mu$m to 5 $\mu$m, thickness W is from 3 $\mu$m to 10 $\mu$m of an electro-optical material, and substrate 211 has a refractive index that is greater than 1.57 with a dimension Z that can be greater than several millimeters. It is preferred that the thickness of layer 209 be optimized so that the electro-optically affected area is uniform in the region closest to core 201. Layer 209 has a refractive index that can be varied from a value of R.I.(cladding)=1.563 to a value of R.I.(core)=1.567 according to the electric field within the electro-optical material as induced by the voltage difference between the pair of electrodes 203. Thus the refractive index of layer 209 can be varied between the values of the refractive index of core 201 (R.I.(core)) and the refractive index of the cladding 203 (R.I.(cladding)). As noted above, it is preferred that when there is no voltage applied to electrodes 213, that is in the absence of an electric field, that the refractive index of layer 209 is equal to the refractive index of cladding 203 (R.I. (cladding)). Under this condition, core 201 is surrounded by a lower index cladding 203 and layer 209, and VOA 101 is a low-loss waveguide.

Figure 10:
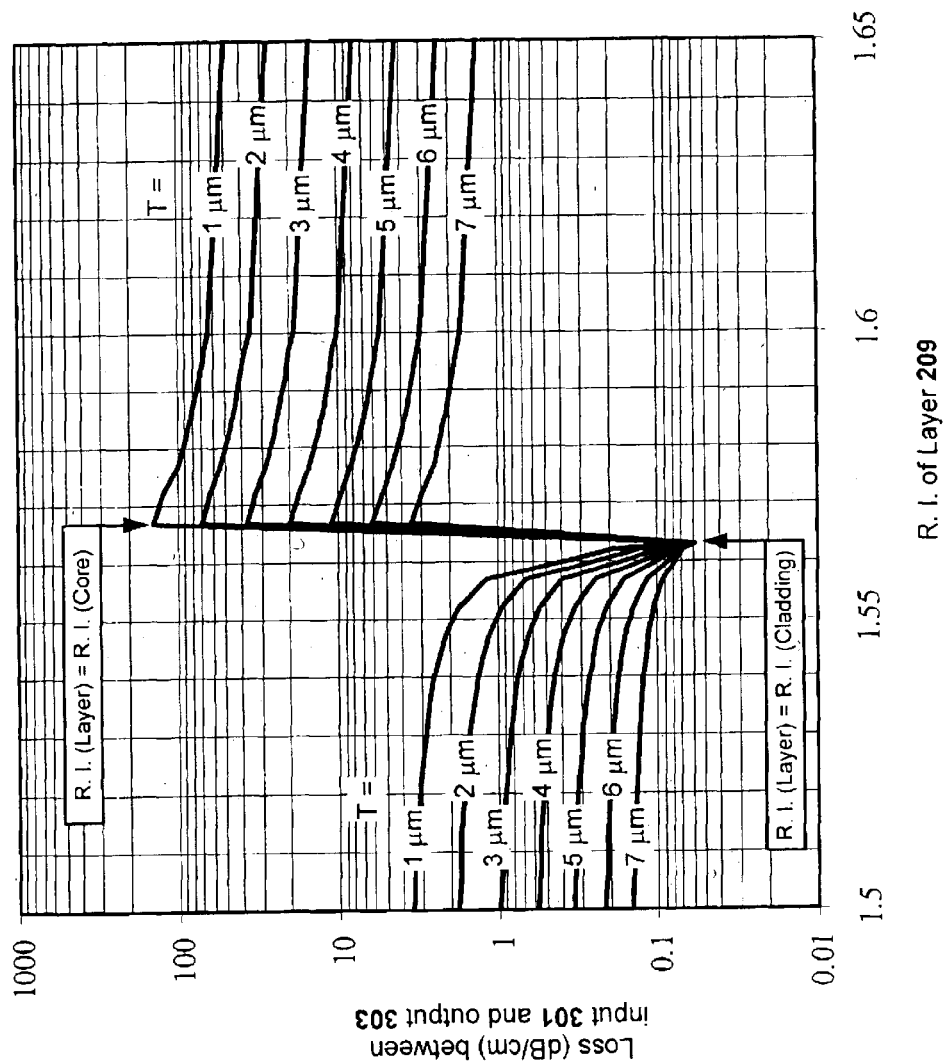
FIG. 10 is a graph showing the results of calculations that predict the effect of lower cladding thickness on the attenuation through the inventive VOA.

The attenuation of light through VOA 101 is illustrated in FIG. 10, which shows a graph of the results of calculations that predict the effect of the thickness of lower cladding on the attenuation through the inventive VOA of FIG. 2–4. Upper cladding 205b and side cladding 205a have a thickness Y=14 $\mu$m, and layer 209 is idealized as a "semi-infinite" material having a refractive index that is uniformly modified by the electro-optical effect. Calculations were performed to show the loss rate in dB/cm along VOA 101 as a function of the refractive index of layer 209 and the thickness T. While there is a wide range of losses as a function of refractive index, the largest variation occurs over a relatively small range of refractive index. Specifically, the loss rate has a minimum value when the refractive index of layer 209 equals the refractive index of lower cladding 207, and has a maximum rate when the refractive index of layer 209 equals the refractive index of core 201. In practice, this change in refractive index could occur for a voltage difference of about 50 to 100 volts applied over an electrode gap of about 5 $\mu$m to 10 $\mu$m.

One of the main parameters in the optical design of VOA 101 is the thickness T of cladding 209. One effect of the choice of the thickness T is a variation of VOA insertion losses. In general, the minimum loss rate is independent of thickness T, while the maximum loss rate increases for thinner thickness T. Thus the use of a small T can allow for a high output-to-input ratio ("extinction ratio") across VOA 101. In one embodiment, VOA 101 has an extinction ratio of about 30–40 dB. In an alternative embodiment, the extinction ration is greater than 10 dB.

Another effect of the thickness T is the attenuation across the VOA. Smaller values of T result in greater attenuation. On the other hand, electro-optical materials usually have higher optical losses than do conventional waveguide materials. Thus, the closer core layer 201 is to layer 209, the higher the insertion losses of the device. A preferred thickness T is from about 2 $\mu$m to about 5 $\mu$m.

There are several method for manufacturing the VOA of the present invention. FIGS. 5A–5E presents a first embodiment of a method for manufacturing VOA array 100 using techniques that are well known in the field of microelectronics and fiber optic manufacturing. FIG. 5A shows the manufacturing after several layers have been deposited on substrate 211. The manufacturing begins with a substrate 211 which can be a silicon or other suitable material. Layer 209 of an electro-optical material having appropriate optical properties is deposited on substrate 211. Layer 209 can be an electro-optic oxide, polymer or other material that is deposited on substrate using spin-coating, spray-coating, sputtering, physical or chemical vapor deposition, or any other appropriate method. Next a metal layer 501 is deposited on layer 209 using sputtering, evaporation, or electroplating methods, for example. A photoresist layer 503 is then coated and patterned through a photomask by means of lithography techniques well known in the industry. As shown in FIG. 5B, metal layer 501 not covered by photoresist 503 is removed by appropriate etching techniques, to form electrodes 213.

The steps leading up to FIG. 5C shows the depositing of the lower cladding 207 and core 201. First, lower cladding 207 is deposited. Lower cladding 207 can be an optical polymer or any other material useful as a cladding of a waveguide. Core 201 is then deposited on lower cladding 207. As shown in FIG. 5D, the structure is then coated with another optical cladding material 505. Lastly, the portions of material 505 and lower cladding 207 not surrounding core 201 are etched, resulting in an array of VOAs. The unremoved portions of material 505 are upper cladding 205 of VOA 101.

Figure 6:
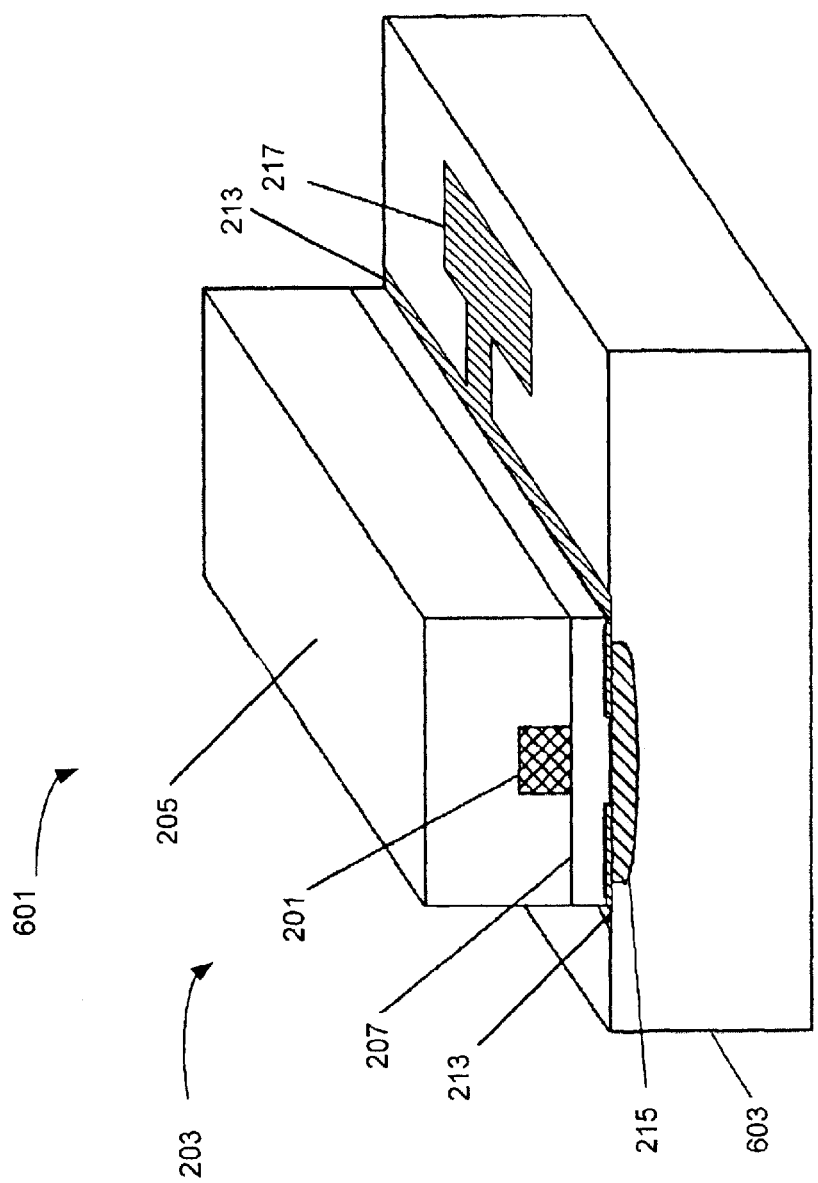
FIG. 6 is a perspective view of a second embodiment VOA of the present invention as a VOA formed on an electro-optic substrate.

An alternative embodiment VOA is shown as VOA 601 of FIG. 6. VOA 601 and 101 both have a core 201 surrounded by a cladding 203 and adjacent electrodes 213. While VOA 101 has an electro-optic layer 209 and non-electro-optic substrate 211, VOA 601 has a substrate 603 formed from an electro-optic material. Substrate 603 is preferably a substrate formed from the materials used to form layer 209. Thus substrate 603 has a refractive index that is equal to that of cladding 203 when no electric field is applied, while that portion of substrate 603 that is in the presence of an electric field has a refractive index that approaches or is equal to that of core 201. Thus the attenuation of VOA 601 is similar to that of VOA 101, with the loss being affected by the refractive index of substrate 601 adjacent to cladding 203 and the thickness T of lower cladding 207.

The manufacturing of VOA 601 is similar, though simpler, than that of VOA 101. Specifically, in the manufacturing of VOA 601 there is no need to first deposit an electro-optic layer on a substrate, as substrate 603 is electro-optic. The remainder of the manufacturing steps are the same as for VOA 101.

Figure 7:
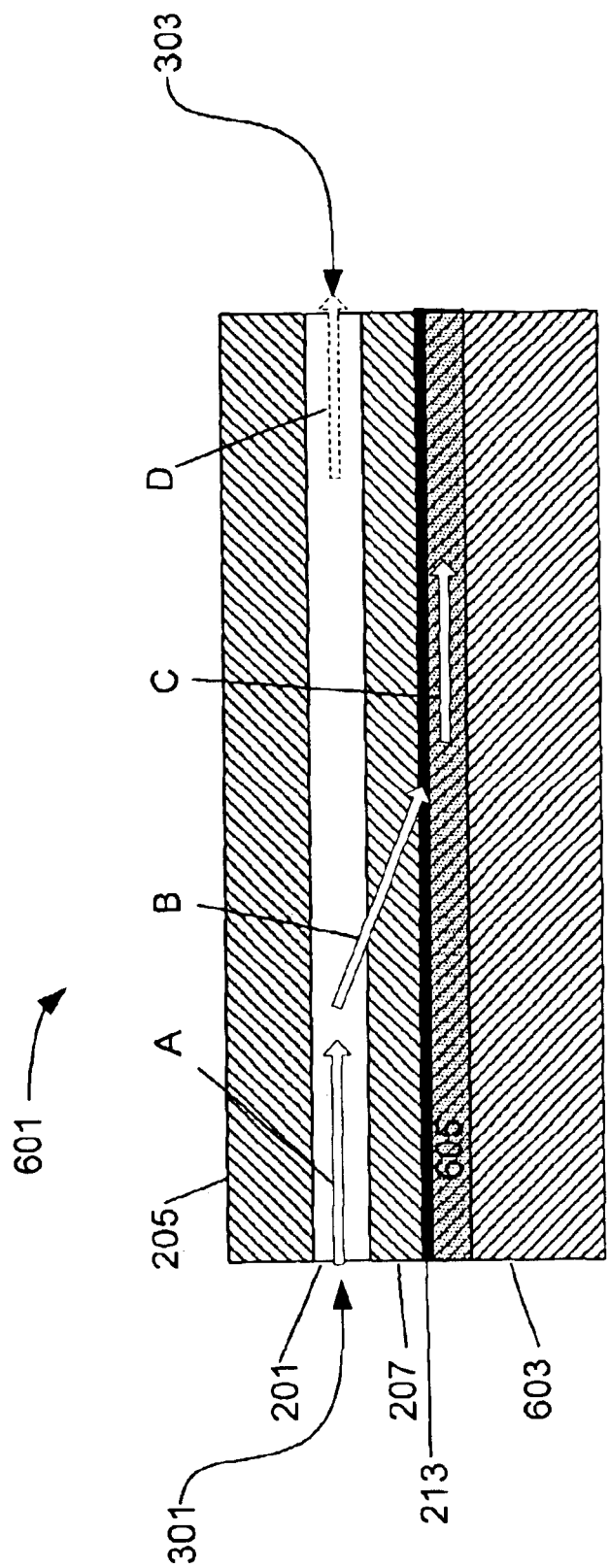
FIG. 7 is a sectional side view through one second embodiment VOA of the present invention, illustrating the propagation of light through the VOA.

FIG. 7 is a sectional side view through VOA 601, illustrating the propagation of light through the VOA. Light from input 301 is shown schematically at arrow A entering core 201. Since electrodes on at the interface between substrate 603 and lower cladding 207, only a portion of substrate 603 will have a refractive index that changes with the voltage difference applied to electrodes 213. Specifically, the portion of substrate 603 that is closest to lower cladding 207 is indicated as portion 605. Portion 605 is not a well defined physical layer, as is layer 209, but is a surface portion of substrate 603 whose refractive index changes due to the applied voltage difference at electrodes 213.

When no voltage difference is applied to electrodes 213, portion 605 has a refractive index that is the same as that of cladding 203, and specifically of lower cladding 207. The majority of light propagating in core 201 travels from the input 301 to the output 303, as indicated schematically as the output of light by arrow D. When the refractive index of portion 605 is the same as that of core 201, light "leaks" from core 201 through lower cladding 207, as indicated schematically by arrows B, and C. As indicated by arrows B and C, under these conditions light first propagates through lower cladding 207 and into portion 605. Since the refractive index of substrate 601 away from portion 603 is lower than that of portion 603, light will continue propagating though portion 603. When the light arrives at output 303, there is little light remaining at the output of core 201.

In general, electro-optical materials are birefringent, having polarization dependent refractive indices. In addition, the electro-optic coefficient (the change in refractive index with electric field) is also polarization dependent. For the VOAs of the present invention, attenuation can thus depend on the polarization of light traveling through the VOA. For example, light having a polarization mode that parallel to the cladding-electro-optical material interface may couple into the substrate, while light that has a polarization mode orthogonal to the interface may not couple into the substrate. Since light entering the VOA is likely to be unpolarized, the structure of VOA 101 or 601 may be modified to provide a polarization independent VOA that uses an electro-optical material adjacent to a waveguide cladding to attenuate light.

Figure 8A:
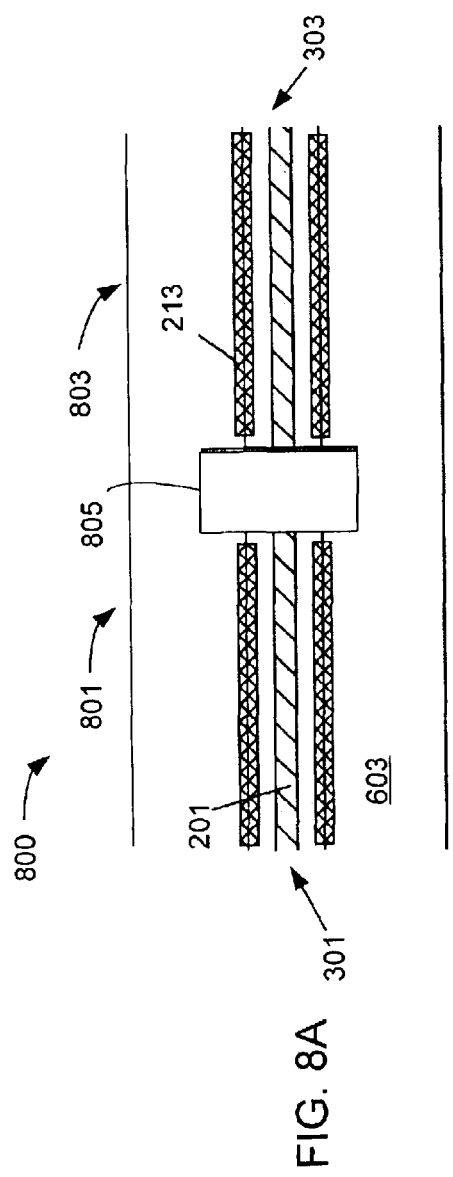
FIG. 8A is a top view and FIG. 8B is a sectional side view illustrating an third embodiment VOA for providing polarization independent attenuation.
Figure 8B:
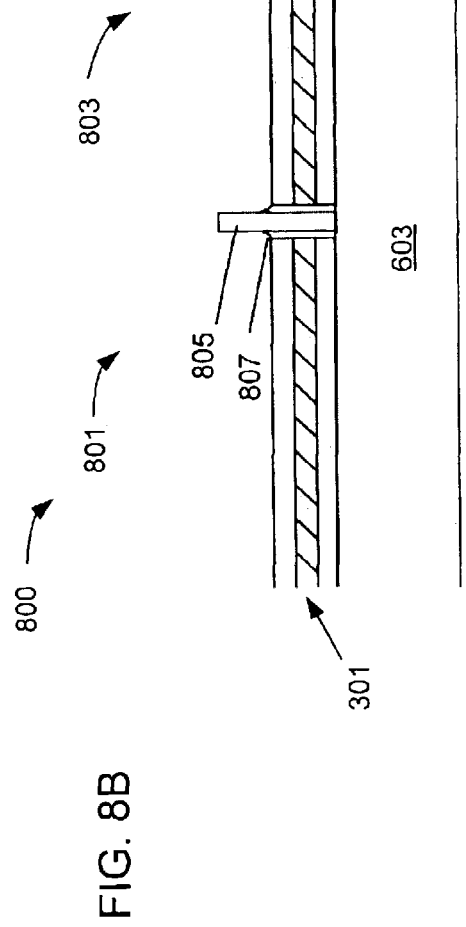

Several alternative VOA embodiments provide for polarization independent variable optical attenuation. A third embodiment VOA having polarization independent attenuation is shown in FIG. 8A as a top view and FIG. 8B as a sectional side view of VOA 800. VOA 800 includes a first VOA section 801, a second VOA section 803, a TE/TM or TM/TE converter 805 inserted within a slot in core 201, and an index matching fluid between converter 805 and VOA sections 801 and 803. Converter 805 is a device that can rotate the polarization of light by 90 degrees, such as a half-wave plate. Sections 801 and 803 are formed on a substrate 603 and are thus similar to VOA 601. Alternatively, sections 801 and 803 can be formed on an electro-optic layer on top of a non-electro-optic substrate, and thus be similar to VOA 101. In either case, electrodes 213 extend the length of VOA 800.

As noted previously, light that is attenuated through VOA 101 or 601 as a result of the electro-optic layer transmitting polarized light. Thus the light remaining in core 201 and cladding 203 becomes polarized. Thus for example, unpolarized light entering input 301 that is attenuated is linearly polarized as it passes through VOA section 801. TE/TM or TM/TE converter 805 rotates the polarization of the light remaining in core 201 and cladding 203 by 90 degrees. The remaining light is then attenuated as it traverses VOA section 803.

Figure 9:
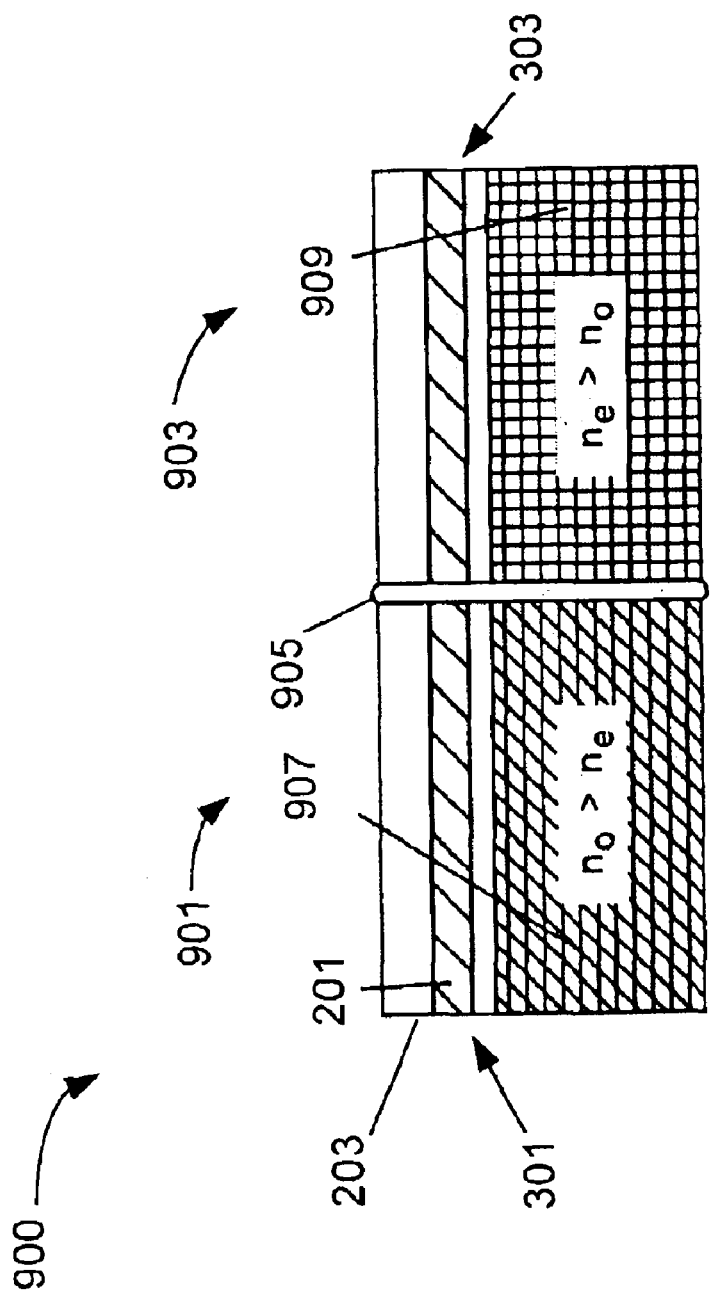
FIG. 9 is a side sectional view illustrating a fourth embodiment VOA for providing polarization independent attenuation.

A fourth embodiment VOA having polarization independent attenuation is shown in FIG. 9 as a side sectional view of VOA 900. VOA 900 includes a first VOA section 901, and a second VOA section 903 joined by an index matching epoxy 905. Each VOA section 901 and 903 includes a core 201 and a cladding 203 Cladding 203 is attached to a first electro-optic substrate 907 (or electro-optic layer) to form first VOA section 901 and is attached to a second electro-optic substrate 909 (or elector-optic layer) to form second VOA section 903. Substrate 907 has an ordinary refractive index that is greater than its extraordinary refractive index. Substrate 909 has an ordinary refractive index that is less than its extraordinary refractive index.

Light attenuated through VOA section 901 is polarized in the extraordinary mode, since core 201 is coupled to the ordinary mode of substrate 907. Likewise, light attenuated through VOA section 903 is polarized in the ordinary mode, since core 201 is coupled to the extraordinary mode of substrate 909. The combination of VOA section 901 and VOA section 903 thus attenuates both the ordinary and extraordinary modes.

Yet another alternative method for linearly attenuating light through a VOA is to modify the polarization mode along the VOA. For example, core 201 and cladding 203 can have cross-sectional areas that change along the length of the VOA. This change in shape with light propagation distance will modify the polarization modes along the VOA, effectively smoothing out the polarization effects and allowing the VOA to provide attenuation independent attenuation.

The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. For example, while the present invention describes the use of silicon to form the substrate, other materials including glass or ceramics may be used. Accordingly, the disclosures and descriptions herein are intended to be illustrative, but not limiting, of the scope of the invention, which is set forth in the following claims.

What is claimed is:

1. A device for variably attenuating an optical signal comprising:

a waveguide having a cladding and an electro-optical material adjacent to at least a portion of said cladding; and at least two electrodes to produce an electric field within said electro-optical material, where the attenuation of light through said waveguide varies with an applied voltage difference to said at least two electrodes.

2. The device of claim 1, wherein the waveguide includes a core having a first refractive index wherein the cladding has a second refractive index, and wherein the electro-optical material has a third refractive index with a value that varies according to the electric field from the value of the first refractive index to the value of the second refractive index.

3. The device of claim 1, further including a silicon substrate, wherein said electro-optical material is a layer on said substrate.

4. The device of claim 1, wherein said electro-optical material is a substrate.

5. The device of claim 1, wherein said device is a polarization independent device for attenuating an optical signal, wherein said waveguide includes:

a first waveguide;

a second waveguide; and a transition portion providing optical communication between said first waveguide and said second waveguide, where said transition portion includes a rotation polarizer to rotate the polarization of light passing between said first waveguide and said second waveguide by 90 degrees.

6. The device of claim 1, wherein said device is a polarization independent device for attenuating an optical signal, wherein said waveguide includes:

a first waveguide having a first electro-optical material;

a second waveguide having a second electro-optical material; and wherein said first electro-optical material has an ordinary refractive index that is greater than said extraordinary refractive index, and wherein said second electro-optical material has an ordinary refractive index that is less than said extraordinary refractive index.

7. A device for variably attenuating a plurality of optical signals comprising:

a plurality of waveguides to each attenuate one of said plurality of optical signals, each of said plurality of waveguides having a cladding and an electro-optical material layer adjacent to at least a portion of said cladding; and at least two electrodes associated with each of said plurality of waveguides, where said at least two electrodes produces an electric field within an associated electro-optical material layer, where the attenuation of individual ones of said plurality of optical signals varies with an applied voltage difference to an associated at least two electrodes.

8. The device of claim 7, wherein each of the plurality of waveguides includes a core having a first refractive index, wherein the cladding of each of said plurality of waveguides has a second refractive index, and wherein each of the electro-optical materials of the plurality of waveguides has a third refractive index with a value that varies according to the electric field from the value of the first refractive index to the value of the second refractive index.

9. The device of claim 7, wherein said plurality of optical signals are provided to said device in a WDM signal, and further including:

a demultiplexer to accept said WDM signal and provide said plurality of optical signals to said waveguides; and a multiplexer to accept said plurality of optical signals from said plurality of waveguides and form an attenuated WDM signals.

10. The device of claim 7, further including a silicon substrate, and wherein said electro-optical material is a layer on said substrate.

11. The device of claim 7, wherein said device is a polarization independent device for attenuating a plurality of optical signals, wherein each of said plurality of waveguides includes:

a first waveguide;

a second waveguide; and a transition portion providing optical communication between said first waveguide and said second waveguide, where said transition portion includes a rotation polarizer to rotate the polarization of light passing between said first waveguide and said second waveguide by 90 degrees.

12. The device of claim 7, wherein said device is a polarization independent device for attenuating a plurality of optical signals, wherein each of said plurality of waveguides includes:

a first waveguide having a first electro-optical material;

a second waveguide having a second electro-optical material; and wherein said first electro-optical material has an ordinary refractive index that is greater than said extraordinary refractive index, and wherein said second electro-optical material has an ordinary refractive index that is less than said extraordinary refractive index.

13. The device of claim 7, wherein said electro-optical material is a substrate.

14. A device for variably attenuating a plurality of optical signals each between an input and an output comprising:

a plurality of waveguides, where each of said plurality of waveguides controllably attenuates one of said plurality of optical signals, and includes a core between an input and an output, and having a first refractive index, a cladding surrounding a substantial length of said core and having a second refractive index different from said first refractive index, an electro-optical material surrounding at least a portion of said cladding, and at least two electrodes to produce an electric field within said electro-optical material, where the attenuation of each of said plurality of optical signals is individually varied by an applied voltage difference to corresponding ones of said at least two electrodes.

15. The device of claim 14, wherein each electro-optical material has a third refractive index with a value that varies according to the electric field from the value of the first refractive index to the value of the second refractive index.

16. The device of claim 14, wherein said electro-optical material has a third refractive index variable by said electric field between the value of said first refractive index to the value of said second refractive index.

17. The device of claim 14, wherein said plurality of optical signals are provided to said device in a WDM signal, and further including:

a demultiplexer to accept said WDM signal and provide said plurality of optical signals to said waveguides; and a multiplexer to accept said plurality of optical signals from said plurality of waveguides and form an attenuated WDM signals.

18. The device of claim 14, further including a silicon substrate, and wherein said electro-optical material is a layer on said substrate.

19. The device of claim 14, wherein said electro-optical material is a substrate.

20. The device of claim 14, wherein said device is a polarization independent device for attenuating a plurality of optical signals, wherein each attenuator includes:

a first attenuator;

a second attenuator; and a transition portion providing optical communication between said first attenuator and said second attenuator;

where said transition portion includes a rotation polarizer to rotate the polarization of light passing between said first attenuator and said second attenuator by 90 degrees.

21. The device of claim 14, wherein said device is a polarization independent device for attenuating a plurality of optical signals, wherein each of said plurality of attenuator includes:
- a first attenuator having a first electro-optical material;
- a second attenuator having a second a second electro-optical material; and wherein said first electro-optical material has an ordinary refractive index that is greater than said extraordinary refractive index, and wherein said second electro-optical material has an ordinary refractive index that is less than said extraordinary refractive index.

\* \* \* \* \*